United States Patent [19]

LeGrand et al.

[11] Patent Number: 4,861,666

[45] Date of Patent: Aug. 29, 1989

[54] ASYMMETRIC IMPACT RESISTANT LAMINATES

[75] Inventors: Donald G. LeGrand, Burnt Hills; William V. Olszewski, Stillwater, both of N.Y.

[73] Assignee: General Electric Company, Pittsfield, Mass.

[21] Appl. No.: 639,708

[22] Filed: Aug. 13, 1984

[51] Int. Cl.$^4$ .............................. F06B 3/26; B32B 9/04
[52] U.S. Cl. ..................................... 428/412; 428/215; 428/447; 428/911
[58] Field of Search ................. 428/34, 215, 412, 426, 428/447, 911

[56] References Cited

U.S. PATENT DOCUMENTS

| | | | |
|---|---|---|---|
| 3,624,238 | 11/1971 | McKenzie | 428/911 X |
| 3,657,057 | 4/1972 | Shorr et al. | 161/2 |
| 4,081,581 | 3/1978 | Littell, Jr. | 428/911 X |
| 4,204,026 | 5/1980 | LeGrand et al. | 428/911 X |
| 4,312,903 | 1/1982 | Molari | 428/34 |
| 4,321,777 | 3/1982 | Sauret et al. | 428/911 X |
| 4,328,277 | 5/1982 | Molari | 428/215 |
| 4,368,226 | 1/1983 | Mucaria | 428/911 X |

*Primary Examiner*—Peter A. Nelson
*Attorney, Agent, or Firm*—Spencer D. Conard

[57] ABSTRACT

This invention concerns an asymmetric impact resistant laminate having at least four lamina bonded by a plurality of adhesive interlayers and alternating in composition between glass and polycarbonate from a front impact receiving lamina of glass to a back spall resistant and controlled thickness lamina of polycarbonate.

8 Claims, No Drawings

ASYMMETRIC IMPACT RESISTANT LAMINATES

The present invention relates to improved asymmetric impact resistant laminates. More particularly, this invention relates to asymmetric laminates wherein the residual stresses at each bonded interface are reduced by controlling lamina thickness and composition. The reduction of such residual stresses results in laminates of improved adhesion and of less tendency to warp. These asymmetric laminates are characterized as having at least four laminae, an equal number of polycarbonate and glass laminae, and laminae which alternate in composition between a back polycarbonate lamina, and a front, that is, impacting receiving lamina of glass.

BACKGROUND OF THE INVENTION

Asymmetric glass-plastic laminates used as safety glass, impact resistant glass, penetration resistant glass, and the like are well known. Particularly, useful and well known among such laminates are those containing laminae of glass and polycarbonate. It is normal practice in the industry in constructing certain such laminates, to utilize glass or relatively hard solid resinous materials as the impact or shock receiving layers while utilizing the polycarbonate as the back or inner or downstream layer or that presented to the person or object being protected.

U.S. Pat. No. 3,666,614 discloses both asymmetric and symetric laminated assemblies for use as structural windshields in motor vehicles. These assemblies are glass-polycarbonate laminates, for example, two ply laminates having a forward facing lamina of glass and a back lamina of polycarbonate. Disclosed embodiments of this invention suffer from, among other deficiencies, a tendency of the back polycarbonate lamina to spall upon impact of an object with the front glass lamina and a tendency of the assymetric embodiments to warp.

U.S. Pat. No. 4,328,277 assigned to the same assignee as the present invention, discloses a bullet resistant laminate, preferably symetrical, having laminae of a solid resinous material such as polycarbonate or glass, adhesive interlayers of a compatible adhesive such as a polydiorganosiloxane-polycarbonate block copolymer, and a back mar resistant polycarbonate lamina of controlled thickness opposite the direction of impact or shock. The disclosed embodiments of this reference provide excellent penetration resistance for the weight and thickness. However, multi-ply asymmetric laminates constructed according to the mechanical variables and ply thicknesses of this disclosure in many cases contain potentially damaging residual stresses.

Thus, while laminates of glass and polycarbonate bonded with adhesive interlayers are well known, such asymmetric laminates having multiple laminae often contain excessive residual stresses at each interface and therefore are subject to warping and delamination. These phenomenon are particularly encouraged in circumstances where the laminate is at low temperature or where a temperature gradient is placed across the laminate.

Therefore, there being no teaching for multi-ply asymmetric laminates having reduced stress in the prior art, it is an object of the present invention to produce multi-ply asymmetric security laminates having less tendency to warp or delaminate.

It is another object of the present invention to provide an improved shock and penetration resistant multi-ply asymmetric laminate exhibiting reduced internal stress.

It is yet another object of the present invention to produce an asymmetric security laminate having a sufficient number of laminae to provide adequate shock and penetration resistance without the associated warping and delamination of residual stress.

DESCRIPTION OF THE INVENTION

Briefly, according to the present invention, it has been found that the tendency of an asymmetric polycarbonate-glass laminate of at least four laminae to warp and delaminate on account of residual stresses at each interface is greatly reduced if the composition of the laminae bonded by a suitable adhesive interlayer alternate between polycarbonate and glass from a back ply of polycarbonate to a front ply of glass. Additionally, the thicknesses of the laminae must be controlled within set limits, that is, the back ply of polycarbonate may have a thickness of from about 30 mils to about 220 mils but preferably between about 30 mils and 150 mils, the laminae of glass may have thicknesses ranging from about 50 mils to about 500 mils and the forward laminae of polycarbonate may have thicknesses ranging between about 50 mils and about 500 mils.

The glass which is to be employed in the laminates of the present invention encompasses all types of glass that have been commonly used in the preparation of glass laminates. Thus, the glass might be common plate glass, thermally tempered glass, chemically tempered glass, or other appropriate types. An example of the chemically tempered glass is that which has been treated chemically with salts in an ion-exchange type process to give a higher tensile and flexural strength glass. A glass treating process of this type is disclosed in U.S. Pat. No. 3,395,998. Tempered glasses are available commercially and are marketed by such companies, as Pittsburgh Plate Glass Company of Pittsburgh, Pa. (thermal tempered glass) and Corning Glass Works, of Elmira, N.Y. (chemically tempered glass). The laminae of glass preferably have thicknesses of the order of about 75 to about 250 mils.

The glass may be transparent, translucent, opaque, and/or tinted, as the application may require. The glass may also contain or have on its surface salts and/or metal oxides that will respond to or conduct an electric current and this allow such glass to be heated by electric current.

Any of the usual polycarbonate resins can be used as laminae for the present invention including but not limited to those described in U.S. Pat. Nos. 3,161,615, 3,220,973, 3,312,659, 3,312,660, 3,313,777, 3,666,614, among others, all of which are included herein by reference. Preferred polycarbonate resins are the aromatic polycarbonate resins.

The polycarbonate may be uncoated or coated on either the internal or external faces or both. The primary function of the coating on an external face is scratch and mar resistance. To perform this function, any suitable scratch and mar resistant coating is suitable so long as the coating or layer of the coating in contact with the polycarbonate is relatively less brittle than the polycarbonate in order to arrest crack propagation from the coating into the polycarbonate. Usually the scratch and mar resistant coatings are a cross-linkable, thermosettable polymer. Well known such coatings in the art are the silicones, acrylics, or the melamines. Often the same scratch and mar resistant coating of the external face may be used on an internally bonded face of the sensitive resinous laminae to protect such from incompatible or aggressive adhesive interlayers such as those containing incompatible plasticizers. Such coatings on an internal face of the polycarbonate lamina are crosslinked and must provide for good adhesion with the interlayer. Examples of such coatings suitable for this second function are the acrylics, melamines, or epoxies.

As stated above, the back ply of polycarbonate may have a thickness ranging between about 30 mils and about 220 mils and preferably between about 30 mils and about 150 mils. The remaining or interior laminae of polycarbonate may have thicknesses ranging between about 50 mils and about 500 mil.

The adhesive interlayer may be any suitable adhesive interlayer known to the art. These adhesive interlayers include the polyvinylbutyrals, ethylene terpolymers, epoxies, polyurethanes, silicones, acrylics, and ethylene acrylic acids, among others. Preferably, the adhesive interlayer has a thickness of from about 5 mils to about 60 mils. The interlayer in contact with any polycarbonate ply must provide not only good adhesion but also, in the absence of protection for the polycarbonate, must be chemically compatible with the sensitive unprotected polycarbonate resin, particularly as to its plasticizer content. The preferred interlayer for contact with the polycarbonate-laminae is a polysiloxane-polycarbonate block copolymer which usually contains no plasticizer.

The polysiloxane-polycarbonate block copolymers can be expressed by the average formula

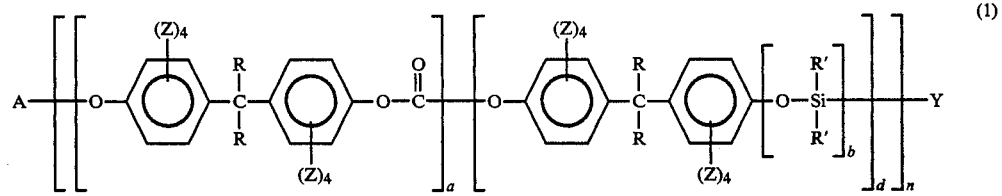

where n is at least 1, and preferably n is an integer equal to from 1 to about 1000, inclusive, a is equal to from 1 to about 200, inclusive, b is equal to from about 5 to about 200, inclusive, and preferably b has an average value from about 15 to about 90, inclusive, the ratio of a to b can vary from about 0.05 to about 3, inclusive, but when b has an average value of from about 15 to about 90, inclusive, the ratio of a to b is preferably from about 0.067 to about 0.45, inclusive, d is 1 or more, Y is

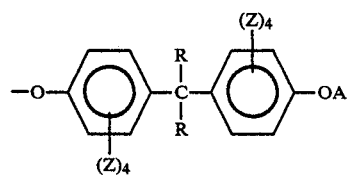

A is a member selected from the class of hydrogen and

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R" is a member selected from the class consisting of monovalent hydrocarbon radicals and halogenated hydrocarbon radicals, and Z is a member selected from the class of hydrogen, lower alkyl radicals and halogen radicals and mixtures thereof.

Included within the radicals represented by R of Formula 1 are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc; R can be all the same radical or any two or more of the aforementioned radicals, R is preferably methyl. R' includes all radicals included by R above except hydrogen, where R' can also be all the same radical or any two or more of the aforementioned R radicals except hydrogen, and R' is preferably methyl. R' includes all radicals included by R above except hydrogen, where R' can also be all the same radical or any two or more of the aforementioned R radicals except hydrogen, cyanoalkyl radicals such as cyanoethyl, cyanobutyl, etc. radicals. Radicals that are included within the definition of Z of Formula 1 are hydrogen, methyl, ethyl, propyl, chloro, bromo, iodo, etc. and combinations thereof, and Z is preferably hydrogen.

The hydrolytically stable copolymers of the present invention can be further described as comprising recurring copolymeric units of a polydiorganosiloxane joined by substituted aryloxy-silicon linkages to a polyester of dihydric phenol and a precursor of carbonic acid, where each of said recurring copolymeric units comprises by average weight from about 10% to about 75% of said polydiorganosiloxane, and preferably from about 40 to 70% by weight.

The copolymers of Formula 1 can be produced by reacting at temperatures in the range of 0° C. to 100° C., preferably 20° C. to 50° C., and in the presence of an acid acceptor, a mixture of a halogen chain-stopped polydiorganosiloxane having the formula

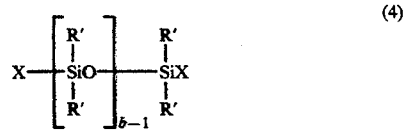

and a dihydric phenol having the formula

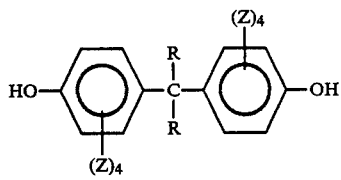

(5)

and thereafter phosgenating said reaction product until the resulting copolymer achieves a maximum intrinsic viscosity, where R, R', Z and b are as defined above, and X is a halogen radical, preferably chloro.

The halogen chain-stopped polydiorganosiloxanes of Formula 4 can be made by conventional procedures such as by the controlled hydrolysis of a diorganodihalosilane, for example, dimethyldichlorosilane as taught in Patnode U.S. Pat. Nos. 2,381,366 and Hyde 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 to about 35% by weight, and preferably from about 1 to about 10% by weight of said halogen chain-stopped polysiloxane. The halogen chain-stopped polysiloxane is preferably in the form of a chlorinated polydimethylsiloxane.

Dihydric phenols that are included in Formula 5 are, for example, 2,2-bis(4-hydroxyphenol)-propane (bisphenol-A); 2,4'-dihydroxydiphenylmethane; bis-(2-hydroxyphenyl)-methane; bis-(4 hydroxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane; 2,2-bis-(3-isopropyl-4-hydroxyphenyl)-propane etc. Mixtures can also be used. Others will occur to those skilled in the art.

The copolymers of the adhesive interlayer essentially comprise recurring units consisting of a polydiorganosiloxane interconnected by substituted aryloxy-silicone linkages to a polyester of carbonic acid precursor and a dihydric phenol.

Materials of the above nature are also described in U.S. Pat. Nos. 3,189,662 and 3,821,325 included herein by reference and can be used either alone as such or in conjunction with well known modifiers to provide particular desired characteristics.

Illustrative of the above block copolymers is General Electric LR-3320. This material has a specific gravity of 1.12, tensile strength of 2500 to 3900 psi, an elongation of 230 to 430, a tear strength (Die C) of 400 lbs/in., and a brittleness temperature below −76° F. and a heat deflection temperature (10 mils under 66 psi Load) of 160° F.

Another such block copolymer, specifically General Electric LR-4020, has a refractive index of 1.506, a tensile strength of 1810 to 2290 psi, an elongation of 530–580%, and a brittleness temperature below −76° F.

Where desirable, adhesion promoting primers can be used to promote adhesion between the laminae and the adhesive interlayer. Useful as the principle ingredient of such primers are the silanes such as, the vinyl alkoxy silanes, aminoalkylalkoxy silanes, alkoxy silanes, silyl peroxides, and aminoalkyoxy silanes or the siloxanes such as aminoalkyl [polyaryloxysiloxanes] or the polydiorganosiloxane-polycarbonate block copolymers. These materials are well known and many are described in U.S. Pat. No. 3,666,614 and elsewhere. Preferred primers for glass to adhesive interlayer bonds are those containing a derivative of the aminoalkyl [polyalkoxysilanes] such as alpha-aminopropyltriethoxysilanes as described in U.S. Pat. No. 4,040,882 or those containing a derivative of an aminoalkyl [polyaryloxysiloxane] such as described in U.S. Pat. No. 4,204,026 both of which are incorporated herein by reference. Preferred primers for polycarbonate to adhesive interlayer bonds are those containing solutions of the above polydiorganosiloxane-polycarbonate block copolymers.

Thus, the present invention includes impact, shock, or penetration resistant laminates of glass and polycarbonate having at least four impact receiving laminae arranged to alternate in composition between polycarbonate and glass from a back lamina of polycarbonate to a front impact or shock receiving lamina of glass bonded by suitable adhesive interlayers. The laminae of glass have thickness between about 50 mils and about 500 mils and the laminae of polycarbonate have thicknesses falling into two categories: the back lamina of polycarbonate, that is the back lamina opposite the direction of impact or shock has a thickness ranging from about 30 mils to about 220 mils and preferably between about 30 mils and 150 mils, the remaining or the interior laminae of polycarbonate have thicknesses ranging from about 50 mils to about 500 mils. Of course, the laminae of glass and polycarbonate need not be of uniform thickness when taken as a whole or separated into their respective classes. Suitable adhesive interlayers are described above, as well as optional protective coatings for the polycarbonate and optional primers to increase adhesion.

The laminate may be constructed and consolidated by any common technique which is known to the art. The physical parameters of the technique chosen to bond the laminate must be compatible with the materials chosen for its construction. Common bonding techniques include the use of an air or oil autoclave with nylon vacuum bags.

DESCRIPTION OF THE PREFERRED EMBODIMENT

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified and the polycarbonate is the polycarbonate of bisphenol-A.

EXAMPLE 1

Example 1 illustrates a prior art laminate over which the present invention represents an improvement. A clean 12"×12" glass panel 125 mil thick was primed to a dried noncritical thickness of 400A on one side with an adhesion promoting solution consisting essentially of an alpha-aminopropyl triethoxysilane. There was then placed a 30 mil thick sheet of LR-3320 polydiorganosiloxane-polycarbonate block copolymer on the primed glass, followed by a 250 mil sheet of polycarbonate. The laid up structure was placed in a steam hydraulic press with a panel of unprimed glass for press polishing at 66° C. and 200 psi. The press was heated to 145° C. and held for 10 to 15 minutes. The heat source was then turned off and water used to cool the laminate to room temperature. When the unprimed glass panel was removed from the laminate, it was convex with the primed glass inside.

EXAMPLE 2

This example illustrates an embodiment of the present invention. There was laminated in an air autoclave and nylon bag at a temperature of 130° C., a pressure of 100 psi and a hold time of 30 min a laminate having a back ply of polycarbonate sheet 118 mils thick bonded by 17 mils of LR-4020 polydiorganosiloxane-polycarbonate block copolymer to a 250 mils thick glass sheet primed to a dried noncritical thickness of 400 A on both sides with an adhesion promoting solution consisting essentially of alpha-aminopropyltriethyoxysilane, which primed glass sheet is in turn bonded to a 218 mils thick sheet of polycarbonate by 17 mils of LR-4020 polydiorganosiloxane-polycarbonate block copolymer, which sheet of polycarbonate is bonded by 17 mils of LR-4020 polydiorganosiloxane-polycarbonate block copolymer to a 250 mil sheet of glass primed on the bonded side with an alpha-aminopropyltriethyoxysilane. An unprimed panel of glass was used for press polishing. The resulting laminate was found to be flat at room temperature.

EXAMPLE 3

This example illustrates an embodiment of the present invention. There was laminated in an air autoclave and nylon bag under the conditions of Example 2 a laminate having a back ply of polycarbonate sheet 60 mils thick bonded by 30 mils of LR-3320 polydiorganosiloxane-polycarbonate block copolymer to a 100 mils thick glass sheet primed to a dried noncritical thickness of 400 A on both sides with an adhesion promoting solution consisting essentially of alpha-aminopropyltriethoxysilane, which primed glass sheet is in turn bonded to a 250 mil thick sheet of polycarbonate by 30 mils of LR-3320 polydiorganosiloxane-polycarbonate block copolymer, which sheet of polycarbonate is bonded by 30 mils of LR-3320 polydiorganosiloxane-polycarbonate block copolymer to a 100 mil sheet of glass primed on the bonded side with alpha-aminopropyltriethoxysilane. An unprimed panel of glass was used for press polishing. The resulting laminate was found to be flat at room temperature.

What is claimed is:

1. A shock and penetration resistant asymmetric laminate exhibiting reduced internal stress consisting essentially of: at least three forward laminae from about 50 mils to about 500 mils in thickness selected from the group consisting of polycarbonate laminae and glass laminae which laminae include one fewer of said polycarbonate laminae than of said glass laminae and are laid up to alternate in composition between glass and polycarbonate; an additional back lamina of polycarbonate laid up opposite the direction of impact or shock and having a thickness of from about 30 mils to about 20 mils; and a suitable adhesive interlayer at each internal interface of said laminate to bond all laminae.

2. A laminate according to claim 1 wherein at least the back polycarbonate lamina is bonded to the adjacent lamina with an adhesive interlayer of polydiorganosiloxane-polycarbonate block copolymer.

3. A laminate according to claim 2 wherein at least one of said glass laminae have a surface priming agent of alpha-aminopropyltriethyoxysilane deposited from solution on at least one surface.

4. A laminate according to claim 2 wherein at least one of said polycarbonate laminae have a polydiorganosiloxane-polycarbonate block copolymer priming agent deposited from an alkanol and halogenated alkyl solution on at least one surface.

5. A laminate according to claim 1 wherein said polycarbonate laminae have a cross-linked mar and plasticizer resistant coating on at least one surface.

6. A laminate according to claim 1 wherein said back polycarbonate lamina has a cross-linked mar resistant coat on at least one exposed surface.

7. A shock and penetration resistant asymmetric laminate exhibiting reduced internal stress consisting essentially of: four laminae laid up to alternate in composition from a back lamina of polycarbonate having a thickness of from about 30 mils to about 220 mils into succeeding laminae of polycarbonate and glass having thicknesses from about 50 mils to about 500 mils and a suitable adhesive interlayer at each internal interface of said laminate to bond all laminae.

8. A laminate according to claim 1 wherein said additional back lamina of polycarbonate has a thickness of from about 30 to about 150 mils.

* * * * *